Jan. 9, 1923.
H. H. TIMKEN.
PROCESS AND APPARATUS FOR BURNISHING CONES FOR ROLLER BEARINGS AND THE LIKE.
FILED SEPT. 1, 1921.
1,441,893.
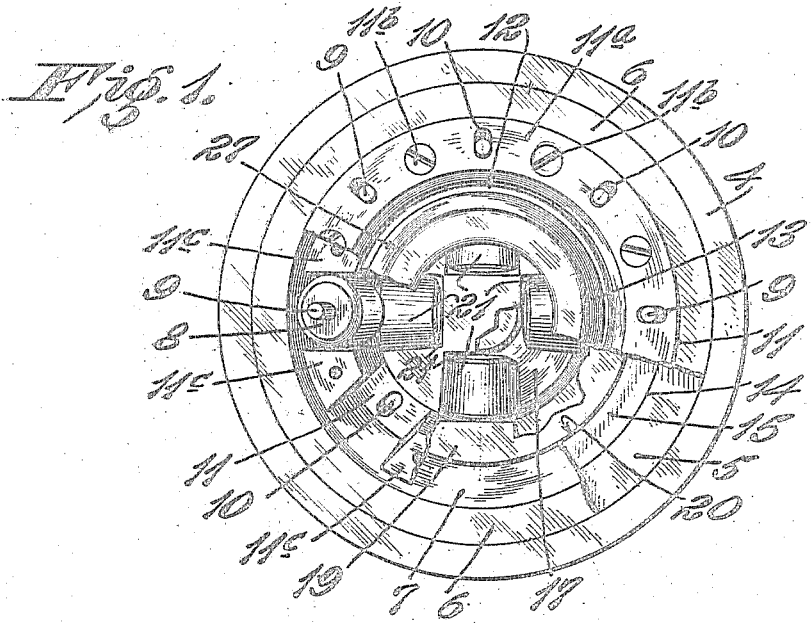
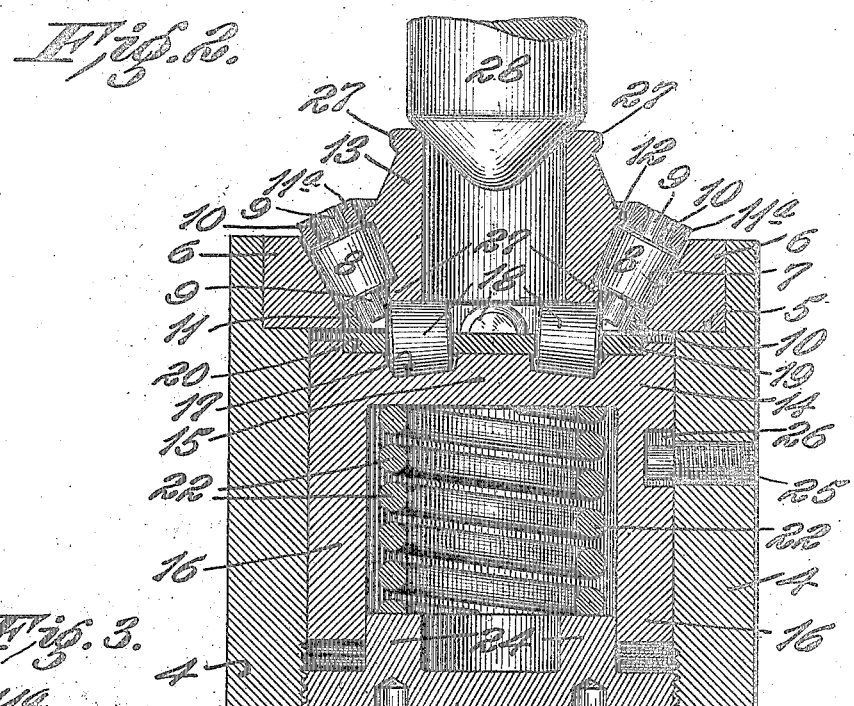

Patented Jan. 9, 1923.

1,441,893

UNITED STATES PATENT OFFICE.

HENRY H. TIMKEN, OF CANTON, OHIO, ASSIGNOR TO THE TIMKEN ROLLER BEARING COMPANY, OF CANTON, OHIO, A CORPORATION OF OHIO.

PROCESS AND APPARATUS FOR BURNISHING CONES FOR ROLLER BEARINGS AND THE LIKE.

Application filed September 1, 1921. Serial No. 497,779.

*To all whom it may concern:*

Be it known that I, HENRY H. TIMKEN, a citizen of the United States, and a resident of the city of Canton, in the county of Stark and State of Ohio, have invented a new and useful Process and Apparatus for Burnishing Cones for Roller Bearings and the like, of which the following is a specification.

My invention relates to the manufacture of cones for roller bearings and the like. Such cones usually have a circumferential rib designed as an abutment for taking the end thrust of the rollers that bear on the race-way or conical surface of the cone; and the side of the rib and the back face of the cone, as well as the race-way itself, require to be accurately finished not only with respect to their individual surfaces but with relation to one another. The bearing surface of such cones must not only be of the proper size and taper and have a smooth and sound surface of accurate circularity; it must also have the bearing side of its rib accurately positioned on the cone for proper cooperation with the rollers, and all sections through said bearing side of the rib at right angles to the axis of the cone ought to be true circles; and likewise, also, the back face must be accurately finished and positioned. Heretofore the work on the race-way, rib and back face has been done in separate operations with cutting tools, thus requiring a high grade of skill and involving considerable expense in producing a green or unhardened cone; and also involving considerable additional expense in grinding the hardened cone to bring it within the limits of precision required for practical use.

The principal object of the present invention is to eliminate or minimize the operations subsequent to hardening, to eliminate or minimize distortion due to hardening, to simplify the operations prior to hardening, and to effect such prior operations under conditions that will minimize errors in the size and taper of the cone and in the relations of the rib and back face thereof to the race-way thereof. It also consists in the operations and in the apparatus hereinafter more fully described and claimed.

In the accompanying drawing, wherein like reference numerals indicate like parts wherever they occur, Fig. 1 is a plan view of an apparatus suitable for use in practicing that process;

Fig. 2 is a vertical cross-sectional view thereof; and

Fig. 3 is a detail cross-section through the cage for the upper series of rollers in the region of one of the fastening members that secure the ring portion of the cage to the body portion thereof.

The device illustrated in the drawing comprises a hollow cylindrical base 4 whose upper end is counter-bored to form an annular shoulder or seat 5; and on this seat rests a ring 6 whose periphery fits against the upper inner surface of the cylinder. The inner surface of this ring is coned or beveled to form a downwardly tapering race-way 7 for a plurality of conical rollers 8. These rollers are preferably provided with spindles 9 extending axially from their ends; and these spindles are disposed in slots 10 provided therefor in a spacing and positioning cage 11. The upper end of the cage 11 is preferably provided with a removable ring 11$^a$, whereby the rollers are removably retained within said cage. The ring 11$^a$ is secured to the cage by means of a series of screws 11$^b$ which pass through said ring and are threaded into holes in the free ends of the spacing portions 11$^c$ of said cage. The slots 10 are elongated radially with respect to the axis of the cage 11 so as to permit the rollers to spread apart or move radially outward when lifted away from their bearing ring 6 or race-way 7. The upper edge of each of these rollers is beveled at the proper angle for working on the side face of the rib 12 of the cone 13, as hereinafter described.

Movably mounted inside of the cylindrical base 4 is a platen 14 in the form of a hollow plunger, that is, a circular upper end 15 with a downward projecting annular wall 16 fitting the interior of said cylindrical base. On the upper surface of said platen is formed a circular race-way concentric with the axis of the cylindrical base. This race-way comprises an annular groove 17 whose bottom is coned or tapered concentric with the axis of the cylindrical base. Resting on and cooperating with said race-way is a series of conical or tapered rollers 18 whose axes center on the axis of the cylindrical base. These rollers are mounted in a suitable positioning cage such, for instance, as a circular blank 19 which fits in a recess 20 provided therefor in the top of the cylindrical base and is provided with holes 21 for the rollers to project through.

Inside of the annular wall of the platen 14 is a coil spring 22 whose upper end bears upwardly against the platen and whose lower end bears against a plug 23 that has a threaded engagement at the bottom portion of said cylindrical base. Preferably this plug has an annular rib 24 that fits inside of the annular wall 16 of said platen and directly receives the thrust of said spring. By this arrangement, the platen is normally pressed upwardly by means of the spring, the pressure of the spring may be adjusted by screwing or unscrewing the threaded plug. The upward movement of the platen is limited by means of a threaded stop or pin 25 that is mounted on the side of the cylindrical shell 4 and projects into a vertically elongated slot or recess 26 provided therefor in the outer wall 16 of the platen. In its upward movement, the platen not only carries the rollers 18 that cooperate with its own race-way 17 but also lifts the first mentioned series of rollers 8 far enough above the beveled ring 5 to permit them to spread far enough for the insertion of the work, usually a cone 13 with a rib 27 on the smaller end thereof.

In use the device above described is mounted on the bed of a machine that is equipped with a rotatable arbor or mandrel 28 and means for exerting endwise pressure on such arbor or mandrel.

The operation of the device is as follows: When the arbor 28 is retracted and the platen 14 is in its raised position, the upper set of rollers 8 spread radially far enough to permit the rib 27 on the smaller end of the green cone 13 to clear the lower ends of said rollers. The cone is placed in position with its rib 12 resting on the beveled upper ends of the rollers 8 of the upper series. The arbor 28 is then lowered into the circular bore of the cone and, by reason of the end of the arbor being accurately coned concentrically with its axis and the axis of the cylindrical base 4 in alinement therewith, it accurately centers the cone upon said alined axes. The further downward movement of the arbor forces the platen downward against the resistance of the compression spring 22 and causes the upper series of rollers 8 to bear upon the race-way 7 provided therefor, whereby said rollers are accurately centered with respect to the axes aforesaid. While the downward pressure of the arbor is maintained, said arbor is rotated; and by reason of its frictional engagement with the cone, it causes the cone also to rotate, and the cone, in turn, causes the rollers of both series to roll on their race-ways as reaction surfaces therefor. The effect of thus rotating the cone on its own axis while maintaining pressure endwise thereof is to smooth or "iron" the portions of the cone surface that are in contact with the rollers, namely, the end or back face of the cone which is in contact with the rollers 18 that are mounted on the resiliently supported platen, the main bearing face of the cone that is in contact with the sides of the rollers 8 of the upper series, and the side of the rib 13 that is in contact with the beveled or coned upper ends of the rollers of the upper series. The operation is in the nature of a burnishing operation wherein very little work is done at any one place at a time but wherein the entire surface is subjected to a multiplicity of operations by each roller acting progressively so that, at the end of the operation, all of the surfaces acted on are very smooth and bright.

It is noted that the race-way 7 for the upper series of rollers 8 functions as a die for determining the size and taper of the cone, while the fact that the main bearing surface of the cone and the face of its rib 12 are burnished simultaneously by the same rollers assures the proper relation of said rib and race-way, that is, the rib is not only positioned at the proper place on the cone but its side face will be a surface of revolution described around the axis of the cone. Likewise, the fact that the end or back face of the cone is burnished simultaneously with the finishing of the bearing surface thereof assures the proper relation between said back face and the race-way of the cone, as special provision is made for maintaining perfect alinement of the platen in all positions of its resilient adjustment.

With cones of the doubly conical type, such as illustrated in Fig. 2, wherein there are two race-ways and the rib 13 is finished on two faces or sides, the operation is completed on the first race-way with its associated rib and back face, whereupon the cone is reversed end for end and the operation is effected on the other race-way either in the same apparatus (if the size and taper permit) or in a separate apparatus.

Obviously the process and apparatus hereinbefore described admit of considerable variation without departing from my invention and I do not wish to be restricted to the details disclosed.

What I claim is:

1. The process of making roller bearing cones and the like which comprises mounting a series of conical rollers to revolve about a common center, centering a cone with relation to said rollers and simultaneously pressing said cone axially against said rollers and rotating said cone on its axis relatively to said rollers.

2. The process of making roller bearing cones and the like which comprises arranging a series of conical rollers on a hollow conical raceway and about a common center with their innermost elements disposed at an inclination to the common axis equal to the inclination of the raceway of the desired cone, centering the cone on said common axis, and simultaneously rotating said cone and pressing it axially against said rollers.

3. The process of making roller bearing cones which comprises the making of the green cone and smoothing a plurality of surfaces thereof without resetting said cone.

4. The process of making roller bearing cones which comprises arranging two series of conical rollers around a common axis, one of said series being yieldingly supported to move longitudinally of said axis and adapted to bear against the end of a cone, and the rollers of the other series having their innermost elements disposed to bear against the race-way of such cone and rotating such cone on such common axis while pressing it endwise against the rollers of both series.

5. The process of making ribbed roller bearing cones and the like which comprises smoothing the bearing surface thereof by rotating the cone on its axis and simultaneously pressing the same endwise against conically disposed rollers whose innermost elements are positioned to smooth the race-way of said cone and whose larger ends are adapted to smooth the side face or the rib of the cone.

6. The process of making roller bearing cones and the like which comprises smoothing the race-way thereof by rotating the cone on its axis and simultaneously pressing the same endwise against two series of rollers, one disposed to bear against the end of the cone and the other disposed to bear against the race-way thereof.

7. The process of making roller bearing cones and the like which comprises smoothing the bearing surface thereof by rotating the cone on its axis and simultaneously pressing the same endwise against two series of rollers, one disposed to bear against the end of the cone and the other disposed to bear against the race-way and side face or the rib thereof.

8. The process of making roller bearing cones and the like which comprises rotating the cone on its axis and simultaneously pressing the same endwise against two series of rollers, one yieldingly mounted opposite the end of the cone and the other conically disposed around the race-way portion of the cone.

9. A device for smoothing cones comprising a conical race-way, a series of conical rollers on said race-way and a rotatable and axially movable spindle disposed axially with respect to said series of rollers to effect rotation of a cone and produce endwise pressure thereon.

10. A device for smoothing ribbed cones for roller bearings comprising a conical race-way, a series of conical rollers on said race-way and a rotatable and axially movable spindle disposed axially with respect to said series of rollers to effect rotation of a cone and produce endwise pressure thereon, the larger ends of said rollers being adapted to work on a side of the rib of a cone while the bodies of the rollers work on the race-way of such cone.

11. A device for smoothing the ends and conical surfaces of cones comprising a conical race-way and a series of conical rollers thereon in position to work on the conical surface of a cone, a second race-way concentric with said first mentioned race-way and having a series of conical rollers thereon in position to work on the end of such cone, and means for rotating such cone and pressing it against both series of rollers.

12. A device for smoothing the ends and conical surfaces of cones comprising a conical race-way and a series of conical rollers thereon in position to work on the conical surface of a cone, a second race-way concentric with said first mentioned race-way and having a series of conical rollers thereon in position to work on the end of such cone, and means for rotating such cone and pressing it against both series of rollers, said second race-way and its rollers being axially movable and yieldingly supported.

13. A device for smoothing hollow cones for roller bearings comprising a series of rollers conically disposed about an axis and a rotatable and endwise movable spindle in alinement with said axis, said spindle having its end coned whereby the longitudinal movement and rotation of said spindle center the cone and then rotate it under pressure against said rollers.

14. A device for smoothing hollow cones for roller bearings comprising a series of rollers conically disposed about an axis and a rotatable spindle in alinement with said axis and arranged to exert pressure axially, said spindle having its end coned to enter the bore of a cone and thereby center the same, whereby said spindle is adapted to center such cone and then frictionally rotate it under pressure axially against said rollers.

15. In a device for burnishing cones that have flanges at their smaller ends, a conical race-way, a series of rollers, and a cage for circumferentially spacing said rollers, said cage having radially elongated openings adapted to permit said rollers to spread radially far enough to permit of the insertion of a flanged cone.

Signed at Canton, Ohio, this 11th day of August, 1921.

HENRY H. TIMKEN.